United States Patent [19]

Townsend

[11] 3,707,758

[45] Jan. 2, 1973

[54] INSTALLATION FOR MOUNTING SEALING RINGS AND THE LIKE, ESPECIALLY FOR RADIOACTIVE ENCLOSURES

[75] Inventor: Eric J. Townsend, Vitry sur Seine, France

[73] Assignee: Commissariat A L'Energie Atomique, Paris, France

[22] Filed: April 16, 1970

[21] Appl. No.: 29,044

[52] U.S. Cl. .................................29/235, 176/30
[51] Int. Cl. ......................B23p 19/04, G21c 19/24
[58] Field of Search ............29/282, 235, 280; 176/30

[56] References Cited

FOREIGN PATENTS OR APPLICATIONS

| 1,494,867 | 8/1967 | France | 29/235 |
| 149,443 | 8/1920 | Great Britain | 29/282 |

Primary Examiner—Andrew R. Juhasz
Assistant Examiner—Michael Koczo, Jr.
Attorney—Cameron, Kerkam & Sutton

[57] ABSTRACT

An installation for mounting extensible rings and comprising a tool for inserting a ring up to the collar of an enclosure at the extremity of a passageway which provides access to said enclosure and for producing the movement of extension of the ring against the collar. The tool comprises a tubular frame which can be temporarily fixed in a predetermined position within the passageway and two concentric tubular elements placed within the frame, said elements being displaceable by two actuating devices. One device produces the simultaneous and axial displacement of both tubular elements within the tubular frame. The other device produces the axial displacement of one tubular element with respect to the other in combination with gripping members which are carried by one of the tubular elements, said gripping members being moved in a substantially radial direction as a result of the relative axial displacements of the two tubular elements.

8 Claims, 6 Drawing Figures

INSTALLATION FOR MOUNTING SEALING RINGS AND THE LIKE, ESPECIALLY FOR RADIOACTIVE ENCLOSURES

The invention relates to the equipment or tools for mounting sealing rings and the like and is more especially concerned with such an equipment for radioactive enclosures which are provided with biological shielding walls.

In French Pats. No. 1,500,165 and No. 1,494,867 which were both filed by the present Applicant on Jan. 8, 1966, it was already proposed to make use of a retaining ring formed of articulated members in order to mount a glove or flexible sleeve in the access port of a radioactive enclosure. This ring is first set in a retracted position in order to permit of its insertion in the passage-way or duct in which the above-mentioned sleeve is to be mounted. After insertion, the ring is then brought to a position of extension in which it is applied and wedged against the wall of said passage-way at the corresponding extremity of the sleeve with interposition of a seal.

In order to carry out these operations, it has been proposed in particular to employ an apparatus or tool having two movements, namely an axial movement and a radial movement.

In the case of a sleeve which is already in position and which it is proposed to replace by a new sleeve, the introduction of the new sleeve takes place in particular in such a manner as to cause the ejection of the old sleeve within the interior of the enclosure, conditions of leak-tightness or radiation containment being therefore maintained.

Having thus defined the state of the art, it should be pointed out that existing facilities of this type suffer from one main disadvantage in that the assembly consisting of retaining ring and seal usually projects inside the above-mentioned passageway. As a consequence, there is no safeguard against the possibility of accidental engagement with this assembly as a result of introduction or displacement of mechanical devices within the passageway, especially in the case of a manipulator which is passed through this latter. Catching of equipment is extremely dangerous because it may result in detachment of the retaining ring, thereby momentarily interrupting radiation-tightness and resulting in contamination.

Moreover, the tool which was employed up to the present time for the purpose of mounting a retaining ring carried out a radial movement so as to permit extension of the ring by means of link-arms which were operated as a result of rotation of transmission rods from a control system located on the accessible side of the wall penetration. It is apparent that, when the walls of the enclosure are of substantial thickness, the length of the rods reduces operational safety to a considerable degree by reason of a phenomenon of twisting of the rods at the time of rotation. A further consequence is that the tool is not sufficiently sturdy to permit the expulsion of an existing retaining ring with a view to replacing this latter with a new ring.

The present invention is intended to circumvent the above-mentioned disadvantages by means of a rugged tool which is easy to operate and also has properties which make it possible to place the retaining ring in a position in which this latter is protected by an annular shoulder.

The invention is directed to an installation for mounting extensible rings and in particular rings made up of articulated members. Said installation comprises a tool for inserting a ring up to an enclosure collar at the extremity of a passageway which provides access to said enclosure and for producing the movement of extension of the ring against said collar. The ring-inserting tool essentially comprises inside a tubular frame adapted to be fixed in a predetermined and momentary position within the access passageway of the aforesaid enclosure two concentric tubular elements which are displaceable by means of two types of actuating means adapted in the case of one type to produce the simultaneous and axial displacement of both elements within the interior of said frame and in the case of the other type to produce the axial displacement of one of said elements with respect to the other in combination with gripping means which are carried by one of said elements and urged in a substantially radial direction as a result of the relative axial displacements of the two elements.

Apart from this main arrangement, the invention comprises a number of other arrangements which are preferably employed at the same time and which will be discussed in greater detail below. There will be described in particular a second arrangement relating to equipment units or tools for inserting and positioning the sleeve and the aforesaid extensible retaining ring or any like components, especially in the case of passageways of substantial diameter and length in which appreciable forces are developed. The second arrangement referred-to consists in constructing equipment units of this type in the form of two elements, especially tubular and coaxial elements which are to be introduced along said passageway and are capable of displacement either simultaneously or in translational motion with respect to each other in combination with gripping means carried by the extremity of one of said elements at the enclosure end, said means being urged in a radial direction as a result of the relative displacement of said elements.

The invention is more particularly concerned with certain modes of application (especially the application which consists in positioning the retaining rings and seals for sleeves which are intended for radioactive enclosures) and also to certain modes of execution of the arrangements aforesaid ; the invention is even more particularly concerned with the equipment units of the above-mentioned type which constitute novel industrial products and entail the application of said arrangements as well as the components which are suitable for the construction of said units and the assemblies or installations which comprise or utilize equipment of this type.

The complementary description which now follows and the accompanying drawings will in any case serve to provide a clear understanding of the invention and, as will be apparent, are given primarily by way of indication.

Figure 6:
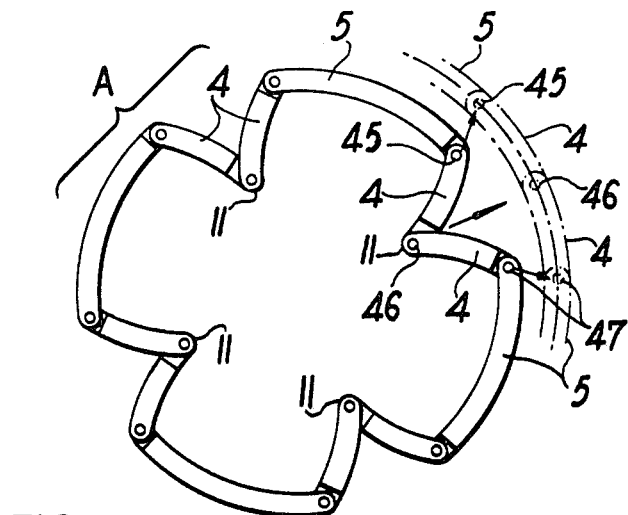
- FIG. 6 illustrates by way of reference an extensible retaining ring of the type already described in the aforesaid patents of the prior art.

In accordance with the invention and more especially in a preferred mode of application and mode of construction of its various parts, the operation is carried out as will now be described hereinafter or in like manner. It will be assumed by way of example that provision has been made for a radioactive enclosure having a shielding wall 1 as shown in FIG. 1, that it is proposed to fix a flexible sleeve 3 at the outlet of a passageway 2 formed in said wall and that there is employed for this purpose an extensible retaining ring A having articulated members 4, 5 (as shown in FIG. 6), said ring being adapted to maintain the corresponding extremity of said sleeve in position against a corresponding and especially cylindrical bearing surface with interposition of a suitable seal 6.

In the first place, the above-mentioned bearing surface 7 will be formed on a component such as an enclosure collar or ring 8 which is secured to the wall 1 at the outlet of the passageway 2. It will be ensured that said bearing surface is set back towards the exterior with respect to the peripheral dimensions of said passageway at the extremity of this latter which opens into the enclosure. By virtue of this arrangement, the ring A or device which serves to retain and seal the sleeve 3 is therefore protected against any accidental engagement with mechanical equipment, manipulators or the like which are passed through said passageway.

Figure 1:
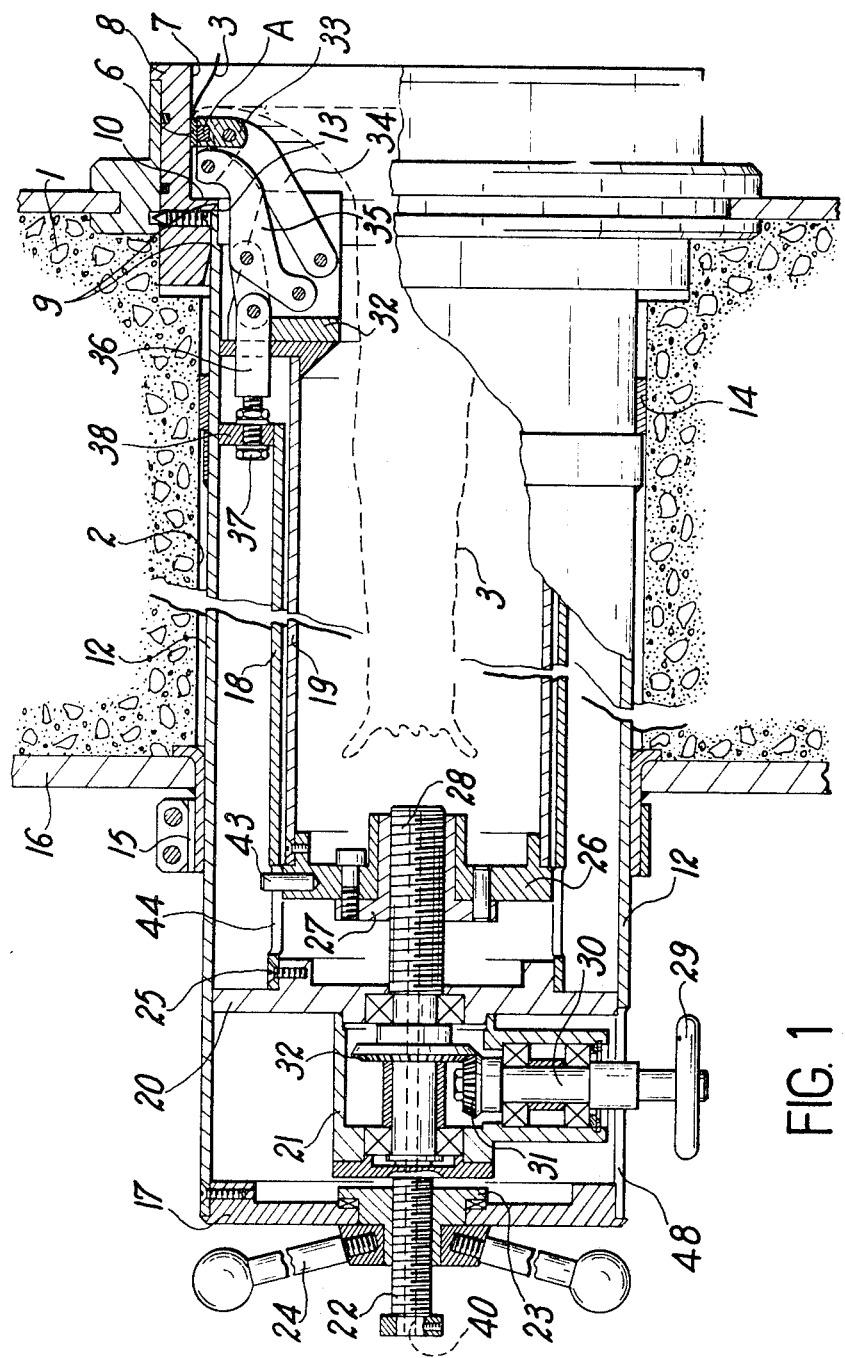
— FIGS. 1 and 2 are respectively a partial axial sectional view and a partial end view showing the complete assembly consisting of a radioactive enclosure and of an equipment unit or apparatus for positioning a sleeve together with its fixing and sealing device.
Figure 2:
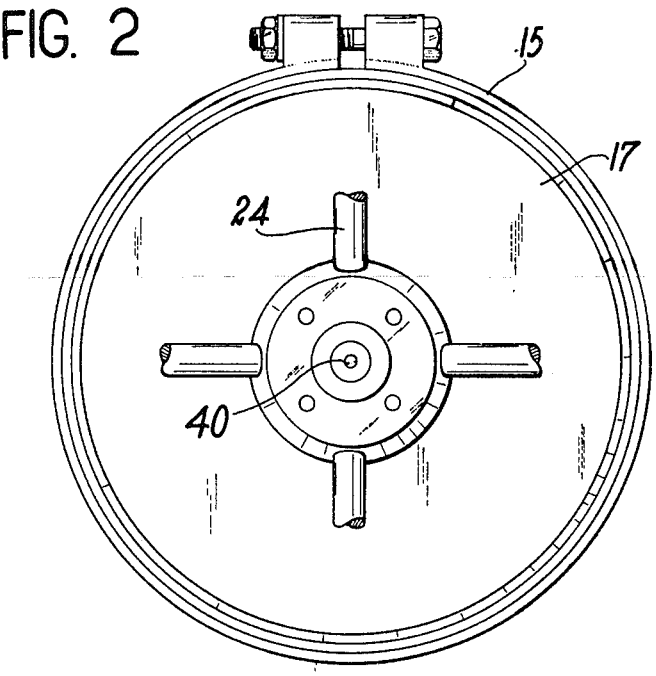
Figure 4:
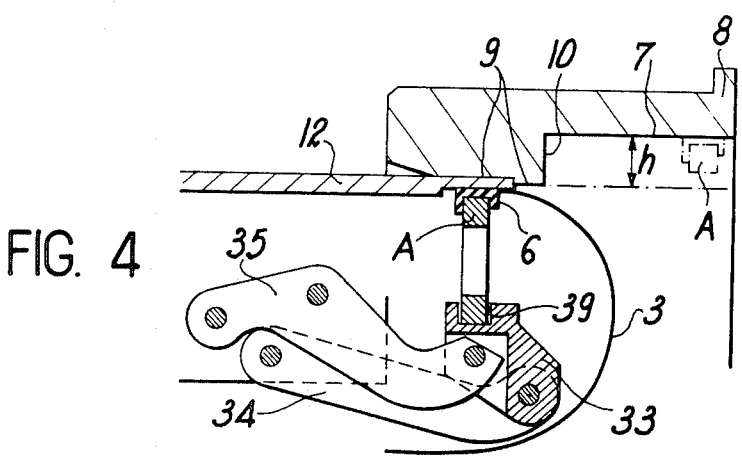

As shown by way of example in FIG. 1, the collar 8 is so designed that its bearing surface 7 is set back at a given distance h towards the exterior (as shown in FIG. 4) with respect to a base 9 which is rigidly fixed to the wall 1. Once the ring A has been placed in position, said ring is therefore protected by the annular shoulder 10 which separates the bearing surface 7 from the base 9. In other words, the circle of extension of the interior of the ring A has a diameter which is greater than that of the passageway 2 or of the base 9 and this is a contributory factor in the prevention of accidental engagements.

In order to position a sleeve 3 together with the ring A and the seal 6 and similarly in order to position a sleeve of this type and to eject a sleeve which is already in position, use can be made of any devices for producing action on the articulations such as 11 (shown in FIG. 6) in accordance with the arrangements already described in the patents cited earlier. However, it will prove preferable to have recourse to an apparatus of the type described hereinafter, especially in the case of passageways 2 of substantial diameter and length which entail the application of large forces.

This apparatus is illustrated in FIGS. 1 to 5 and essentially comprises two coaxial tubular elements of particularly high strength which are capable of being displaced either simultaneously or relative to each other. One tubular element is adapted to carry gripping means for producing action on the ring A, said means being capable of radial displacement as a result of relative axial displacements of the two tubular members.

It is apparent that :

- on the one hand, there is a possibility in a predetermined position of the assembly of both tubular elements to displace one of these latter with respect to the other so as to bring the gripping means from the retracted position to the position of expansion or conversely,
- and, on the other hand, when the assembly is in the position of expansion, there is a possibility of displacing the entire assembly in the axial direction without modifying the relative axial positions of the two tubular elements, thereby making it possible in particular to carry out the ejection of an existing sleeve, then to move the new sleeve into its protected position behind the annular shoulder 10, as will be described in greater detail hereinafter.

In any case, the kinematic means for obtaining these different movements will be constructed with precision by making use of devices of the screw and nut type, for example, which have zero backlash and are controlled from hand-wheels having readily located positions so as to permit "blind" operation. In fact, in installations of this type, the operator is not able to exercize visual control either in the case of the gripping means referred-to above or in the case of the ring. The operator must therefore be permitted to determine a priori the position of said means according to the position of the control hand-wheels.

For example, the assembly is constructed in the following manner as illustrated in the accompanying drawings.

The apparatus comprises firstly an outer tubular frame fitted with means for fixing said frame to the enclosure wall 1 in an accurate manner.

Said tubular frame is shown at 12 and the extremity 13 of said frame is abuttingly applied, for example, against an annular shoulder of the base 9. Similarly, centering stops can be provided at 14.

Said frame is secured in this position by means of a clamping collar 15 forming part of an outer face plate 16 which is rigidly fixed to the wall. Said frame is closed by an end-plate 17.

Within the interior of the tubular frame which is thus constructed and fixed in position, there are mounted the two tubular elements which were referred-to above and which are shown at 18, 19.

Consideration will be given first to the tubular element 18 which is the outer member in this case. This element is rigidly fixed at 25, namely at the end remote from the enclosure, to an end-plate 20 which forms one piece with a casing 21, said casing being intended to accommodate the components which serve to actuate the second tubular element 19. Said casing itself is adjacent to a threaded hub 22 on which is engaged a nut 23, said nut being rigidly fixed to a hand-wheel 24 — referred-to hereinafter as the vertical hand-wheel — and being rotatably mounted in the aforesaid end-plate 17.

It is apparent that the movement of rotation of the vertical hand-wheel 24 causes the movement of translation of the tubular element 18 along its axis as well as the movement of translation of the other members with which it cooperates and especially the second tubular element 19. It will be understood that means are provided in order to prevent rotational motion of the tubular element 18.

Consideration will now be given to the second tubular element 19. This element is rigidly fixed at the end remote from the enclosure to an end-plate 26 which is adapted to carry a nut 27 and this latter is mounted on a threaded hub 28 which is actuated from the casing 21.

Said hub 28 is driven in rotation from a second hand-wheel 29 — referred-to hereinafter as the horizontal hand-wheel — which is mounted on a shaft 30, said shaft being located transversely with respect to the hub and actuated by the hand-wheel via a pair of bevel gears 31, 32. The shaft 30 is adapted to traverse the stationary casing 12 through an elongated opening 48, thus preventing rotational motion of the bearing tubular element 18. Similarly, the second tubular element 19 is prevented from rotating by a stud 43 within an elongated slot 44.

The rotation of the horizontal hand-wheel 29 therefore causes axial displacement of the second tubular element 19 with respect to the first element 18.

Finally, the second tubular element 19 is provided at the end nearest the enclosure with a number of supports 32 on which are mounted the gripping means for producing action on the extensible ring A, especially by being brought to bear on the articulations 11 (shown in FIG. 6).

In the case of each articulation 11, said gripping means comprise, for example, a holding head 33 carried by link-arms such as 34, 35, said arms being pivotally attached at one end to said head and at the other end to the corresponding support 32 so that the whole structure operates in much the same manner as a parallelogram.

This parallelogram is made deformable as a result of the relative movement of axial translation of the two tubular elements 18, 19 (this movement of translation being controlled from the hand-wheel 29).

In order to obtain this movement, one of the link-arms aforesaid is coupled to the outer tubular bearing element 18 by means of a link-arm device 36 which is secured by adjustable means 37 to a support 38 which is rigidly fixed to said element 18.

The pivot-pins are placed in such a manner that, under the action of a relative movement of translation of the two tubular elements 18, 19, the movement of the holding head should take place substantially in a radial plane, that is to say without applying any appreciable axial force component to the ring A.

The number of devices of this type (each device being thus considered to comprise a support 32, the corresponding link-arm system and the head 33) corresponds to the number of articulations 11 in the ring A and consists, for example, of four devices in the case of the ring of FIG. 6.

Figure 5:
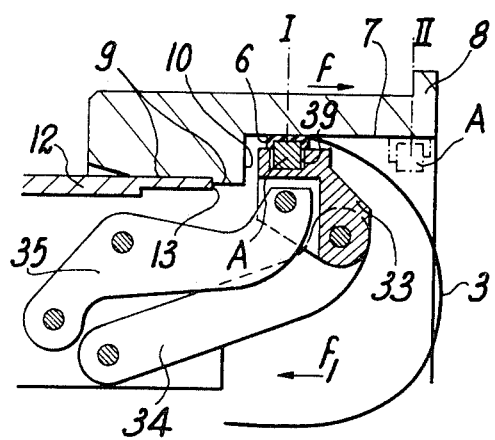

The holding heads 33 have recesses 39 which are intended to receive said articulations 11, that is to say the corresponding extremities of the members 4 which are adjacent to said articulations, so that the ring A can readily be put in the retracted position as shown by way of example in FIG. 4 and so as to cause the subsequent movement of extension of said ring to the position shown in FIG. 5.

The apparatus will be completed by means for blowing compressed air in order that the sleeve 3 should be caused to extend towards the interior of the enclosure, said sleeve having been initially mounted inside-out within the passageway 2 as shown in broken lines in FIG. 1. These means consist, for example, of a duct 40 which is formed within the interior of the hubs 22 and 28 and through which the compressed air can be blown.

By means of an apparatus of this type and solely as a result of operation of the two hand-wheels 24 and 29, the operation which consists either in mounting a flexible sleeve or replacing a worn sleeve with a new sleeve is carried out, for example, in the manner which will now be described.

Figure 3:
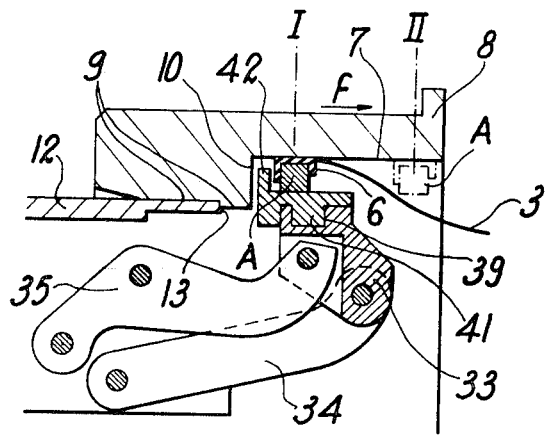
- FIGS. 3 to 5 are partial axial sectional views in which elements of said apparatus are illustrated separately in different operating positions.

It will be assumed hereinafter that the collar 8 is already fitted with its sleeve 3 as shown in FIG. 3.

The operations to be carried out by means of the apparatus will be as follows and in the same sequence :

— a. displacement of the existing ring from position I to position II up to the edge of the collar 8, that is to say on the one hand in order to provide a free space for the introduction of the new sleeve and on the other hand in order to prepare the ejection of the old sleeve by means of the new sleeve (as shown in FIG. 3);

— b. mounting of the new ring with the new sleeve at the location which has just been prepared on the bearing surface (as shown in FIGS. 4 and 5);

— c. and finally the movement of translation of the new assembly towards the enclosure and in the direction f in order to displace and eject the old assembly from the collar 8, this movement being followed by a movement of translation in the opposite direction $f_1$ in order to bring the new assembly into the correct position behind the protection shoulder 10 (as shown in FIG. 5).

These operations are carried out in the manner which will now be described by way of example.

In order to perform the operation a, it could be considered sufficient to produce action by means of the holding heads 33 by endeavouring to bring the recesses 39 opposite to the corresponding members of the ring A. However, the operation would prove extremely difficult. It therefore appears preferable to cover said holding heads with shoes 41 (as shown in FIG. 3) which will be provided with a driving or transfer flange 42 for carrying out with complete safety and reliability the displacement of the assembly consisting of ring, seal and sleeve in the direction f towards position II.

This operation a will be prepared from the exterior of the enclosure. In other words, the shoes 41 will be mounted on the heads 33 while the apparatus is supported, for example, on a table and the link-arms 34, 35 are in the withdrawn position. When in readiness for use, the apparatus is then introduced in the passageway 2, abuttingly applied against the stops 13 and 14 in an accurate manner and secured by means of the collar 15, whereupon it remains to carry out the necessary operations on the vertical hand-wheel 24 and on the horizontal hand-wheel 29.

The vertical hand-wheel is brought to a reference position which corresponds exactly to the point of arrival of the gripping means in the plane I. The horizontal hand-wheel is then operated up to a reference position corresponding to the extension of the gripping means while nevertheless taking into account the thickness of the shoes 41. It then only remains to operate the vertical hand-wheel up to a reference index which corresponds to position II.

The sleeve to be ejected is therefore brought in a wholly reliable manner to its pre-ejection position at the edge of the enclosure collar 8. On completion of the last-mentioned operation, the apparatus can be withdrawn after having retracted the holding heads (no danger is involved since radiation-tightness is maintained by means of the old sleeve which still remains in position).

In order to carry out operation b, the apparatus which has been withdrawn is again placed on a table and the shoes 41 are removed. The link-arms and heads which are in the retracted position are then covered by the new ring A which is also retracted and surrounded by the elastic seal 6 and the edge of the new sleeve 3, said sleeve being withdrawn into the interior of the apparatus.

The apparatus is reintroduced into the passageway 2 and secured therein as before, whereupon the two hand-wheels are operated in the appropriate manner.

FIG. 4 shows the position of the new ring and of the new sleeve at the entrance of the enclosure collar 8. At this moment, the ring is still retracted. The assembly is then moved forward axially by means of the vertical hand-wheel in order to release the ring from the collar base 13, whereupon the horizontal hand-wheel is rotated up to a reference index which corresponds to the maximum extension of the ring (without shoes). Said ring is thus brought to its position of fastening and clamping of the sleeve seal and will be maintained in this position especially by virtue of a suitable wedging action as obtained by suitable relative displacement of the pivot-pins 45, 46, 47 (FIG. 6) with respect to the center-line of the ring.

As shown in FIG. 5, it is then necessary :
— to rotate the vertical hand-wheel once again so as to effect the axial displacement of the assembly from position I to position II (direction $f$), with the result that the new assembly accordingly displaces the old assembly and ejects this latter into the enclosure,
— and to rotate the vertical hand-wheel in the opposite direction ($f_1$) in order to return the new assembly to its correct position of protection behind the annular shoulder 10.

As is apparent, the substitution has taken place without any attendant danger of interruption of radiation-tightness.

It then only remains to deliver compressed air through the duct 40 in order to turn the sleeve inside-out.

The apparatus is then released (collar 15) and demounted.

The operation of the assembly which is thus obtained has been sufficiently clearly brought out in the foregoing and therefore calls for no extended description. It may be concluded that, whatever mode of execution may be adopted, the assembly provides a large number of advantages over comparable methods and apparatuses of the prior art and in particular the following :

— that of ensuring protection of the extensible ring and of its assembly against all accidental engagement with devices or components which are introduced into the passageway and intended to cooperate with the sleeve ;
— that of ensuring control of axial displacements and transverse displacements with a high degree of precision by virtue of screw and nut mechanisms which have no appreciable backlash ;
— that of making it possible by means of the precision thus achieved to carry out displacements in blind operation by noting only the positions of the hand-wheels with respect to reference marks ;
— that of rugged construction of the apparatus, thereby permitting the application of large forces which are generated in the case of passageways of appreciable diameter and length ;
— that of ensuring that the holding heads carry out substantially radial displacements so that fixing of the ring by wedging in position is carried out in an ideal manner ;
— and consequently the advantage of ensuring substitution of a new sleeve for an old sleeve under the most favorable conditions of safety, reliability and leak-tightness.

As is readily understood and as the foregoing description has furthermore made apparent, the invention is not limited in any sense to those modes of application or to those modes of construction of its various parts which have been more especially contemplated. On the contrary, the scope of this invention extends to all alternative forms which entail the application of the equipment described above in combination with enclosures other than those which are provided with biological shielding walls. It is also understood that the means employed to operate the apparatus for positioning the rings could be either hydraulic, pneumatic, electric or the like.

What I claim is:

1. An installation for mounting extensible rings including a tool for inserting a ring up to an enclosure collar at the extremity of a passageway providing access to the enclosure and for movement of extension of said ring against said collar, said tool comprising a tubular frame fixed within said passageway, two concentric tubular elements inside said tubular frame, first actuating means for simultaneously and axially displacing both of said tubular elements within said frame, second actuating means for axial displacement of one of said tubular elements with respect to the other of said tubular elements, gripping members having a plurality of holding heads, link arms connecting said members to one of said tubular elements and means for connecting said link arms to the other of said tubular elements, said gripping members being urged in a radial direction upon said relative axial displacement of said tubular elements.

2. An installation in accordance with claim 1, wherein the enclosure collar is provided with a bearing surface for said ring in the fastening position thereof, said bearing surface being set back towards the exterior with respect to the peripheral surface of the access passageway and to a distance which is sufficient to ensure that the internal extension circle of the ring in the fastening position thereof has a larger diameter than the diameter of said passageway so that the ring is thus protected by means of an annular shoulder after assembly.

3. An installation in accordance with claim 1, wherein said installation comprises shoes which can be fitted on the gripping members of said tool so as to thrust an existing ring up to a position of pre-ejection prior to placing a new ring in position.

4. An installation in accordance with claim 1, wherein said actuating means are actuated from two hand-wheels or like separate components and produce action on screw and nut devices carried by the two elements to be actuated.

5. An installation in accordance with claim 1, wherein one of the two concentric tubular elements can be displaced by means of a screw disposed axially and adapted to cooperate with a nut which is mounted in the end-plate of the tubular frame.

6. An installation in accordance with claim 1, wherein the axial displacement of the second concentric tubular element with respect to the first is obtained by means of a screw disposed axially and adapted to cooperate with a nut carried by the end-plate of said second element.

7. An installation in accordance with claim 6, wherein the screw which serves to carry out the displacement of the second tubular element is actuated by means of a bevel-gear drive system which is operated by a hand-wheel whose shaft traverses the body of the frame through an elongated opening.

8. An installation in accordance with claim 1, wherein said link-arms are in the form of a quadrilateral or parallelogram which is so designed that said link-arms produce a substantially radial displacement of the holding head.

* * * * *